(12) United States Patent
Albisa

(10) Patent No.: US 7,889,062 B1
(45) Date of Patent: Feb. 15, 2011

(54) REMOVABLE TRAILER HITCH SECURITY SYSTEM

(76) Inventor: Hubert Albisa, 18241 NW. 86 Ave., Miami, FL (US) 33015

( * ) Notice: Subject to any disclaimer, the term of this patent is extended or adjusted under 35 U.S.C. 154(b) by 352 days.

(21) Appl. No.: 12/263,721

(22) Filed: Nov. 3, 2008

(51) Int. Cl.
*G08B 21/00* (2006.01)
*B60D 1/60* (2006.01)

(52) U.S. Cl. .............. 340/431; 340/686.4; 340/687; 280/501; 280/507; 280/656; 307/9.1

(58) Field of Classification Search ............... 340/531
See application file for complete search history.

(56) References Cited

U.S. PATENT DOCUMENTS

| | | | |
|---|---|---|---|
| 3,782,761 A | 1/1974 | Carding, Sr. | |
| 5,223,844 A * | 6/1993 | Mansell et al. | 342/357.31 |
| 6,889,995 B2 | 5/2005 | Staggs | |
| 6,910,705 B1 | 6/2005 | Hrwood et al. | |
| 6,971,663 B1 | 12/2005 | Blake | |
| 6,980,096 B1 | 12/2005 | Washington, III et al. | |
| 7,246,810 B2 | 7/2007 | Bussiere et al. | |
| 2004/0080141 A1* | 4/2004 | Hart | 280/507 |
| 2004/0164518 A1 | 8/2004 | Staggs | |

* cited by examiner

*Primary Examiner*—Donnie L Crosland
(74) *Attorney, Agent, or Firm*—Albert Bordas, P.A.

(57) ABSTRACT

A removable trailer hitch security system, comprising a housing assembly. The housing assembly comprises first and second ends and at least first, second, third, and fourth walls. The first and second walls comprise first holes that align. The first holes having first cooperative dimensions and shape to receive a first locking pin therethrough. The first end receives a hitch of a trailer assembly. A male member protrudes from the second end. The male member has a distal end. The male member further comprises fifth, sixth, seventh, and eighth walls. The fifth and sixth walls comprises second holes that align. The second holes have second cooperative dimensions and shape to receive a second locking pin therethrough. The distal end inserts into a hitch receiver of a vehicle assembly. The present invention further comprises first and second cable assemblies and an electrical system.

20 Claims, 4 Drawing Sheets

REMOVABLE TRAILER HITCH SECURITY SYSTEM

BACKGROUND OF THE INVENTION

1. Field of the Invention

The present invention relates to trailer hitch accessories, and more particularly, to a removable trailer hitch security system.

2. Description of the Related Art

Unfortunately, vehicles and trailers are stolen each and everyday. Prior art locking systems and alarms have had limited success. However, none teach the innovative characteristics of the present invention.

Applicant believes that one of the closest references corresponds to U.S. Pat. No. 7,246,810 issued to Bussiere, et al. on Jul. 24, 2007 for Hitch Locking Module. However, it differs from the present invention because Bussiere, et al. teaches a hitch locking module constituted of a box like device having a hingedly-attached cover, which locks shut over the ball attachment of a tow bar, thus making it impossible to unhitch the tow bar unless one has a key to open the cover of the hitch locking module.

Applicant believes that another reference corresponds to U.S. Pat. No. 6,980,096 issued to Washington, III, et al. on Dec. 27, 2005 for Trailer Hitch Safety System. However, it differs from the present invention because Washington, III, et al. teaches a hitch mechanism that comprises an interlocking safety pin and a sleeve or other mechanism, which in a locking position, exposes a hole, which is adapted to receive the safety pin. The safety pin includes an interlock to activate either an audible alarm, a visible alarm, of both. In an alternative embodiment, the pin mechanism further includes means to foil a would-be thief in uncoupling the towed vehicle. In a further alternative embodiment, the safety pin includes an internal power supply to eliminate certain wired connections.

Applicant believes that another reference corresponds to U.S. Pat. No. 6,889,995 issued to Staggs on May 10, 2005 for Hitch Locking Mechanism. However, it differs from the present invention because Staggs teaches a hitch locking mechanism that enables secure retention of a towing vehicle to a towed vehicle. The hitch-locking member comprises a shank and a clamp member. The clamp member includes a base, an arm, and a jaw. The jaw is pivotally attached to the base member, and moves relative to the arm between an upright position and an extended position. The shank is securely affixed to the clamp member at multiple points for secure retention of the towing vehicle to the towed vehicle. A first sleeve is positioned about the shank when the shank is retained to the clamp member. The first sleeve enables rotation of the shank relative to the clamp member when the shank is secured within the clamp member.

Applicant believes that another reference corresponds to U.S. Pat. No. 3,782,761 issued to Cardin, Sr. on Jan. 1, 1974 for Locking Hitch Box Cover. However, it differs from the present invention because Cardin, Sr. teaches a locking hitch box cover, for a hitch box having an open end and an opening in a side thereof, comprising a body shaped for insertion in the open end of the hitch box, a key operated locking mechanism attached to said body and having a part biased to enter the opening in the hitch box upon insertion of the body into the hitch box to restrain the body from withdrawal from the hitch box, and key actuated means comprising a part of the locking mechanism to restrain retraction of the part from the opening. The body includes first, second, third and fourth walls with the locking mechanism mounted on the fourth wall. The fourth wall is free at one end and biased away from the first wall to hold two walls against opposed faces of the hitch box.

Applicant believes that another reference corresponds to U.S. Patent Application Publication No. 2004/0164518, published on Aug. 26, 2004 to Arnol Staggs for Hitch Locking Mechanism. However, it differs from the present invention because Staggs teaches a hitch locking mechanism enables secure retention of a towing vehicle to a towed vehicle. The hitch-locking member comprises a shank and a clamp member. The clamp member includes a base, an arm, and a jaw. The jaw is pivotally attached to the base member, and moves relative to the arm between an upright position and an extended position. The shank is securely affixed to the clamp member at multiple points for secure retention of the towing vehicle to the towed vehicle. A first sleeve is positioned about the shank when the shank is retained to the clamp member. The first sleeve enables rotation of the shank relative to the clamp member when the shank is secured within the clamp member.

Applicant believes that another reference corresponds to U.S. Pat. No. 6,971,663 issued to Blake on Dec. 6, 2005 for Trailer Hitch Cover Assembly. However, it differs from the present invention because Blake teaches a trailer hitch cover assembly for a motor vehicle that includes a hitch insert having an aperture extending longitudinally therethrough to fit over a hitch tube of a trailer hitch on a motor vehicle, and a rotatable door covering the aperture. The trailer hitch cover assembly also includes a top cover plate mounted to the hitch insert and a front cover plate mounted to the hitch insert and having an aperture extending therethrough aligned with the hitch tube of the trailer hitch.

Applicant believes that another reference corresponds to U.S. Pat. No. 6,910,705 issued to Harwood, et al. on Jun. 28, 2005 for Trailer Hitch Receiver Cover. However, it differs from the present invention because Harwood, et al. teach a cover for a hitch receiver that includes a removable cover plate, which may incorporate a theft deterrent design and may be illuminated by an electroluminescent sheet.

Other patents describing the closest subject matter provide for a number of more or less complicated features that fail to solve the problem in an efficient and economical way. None of these patents suggest the novel features of the present invention.

SUMMARY OF THE INVENTION

The instant invention is a removable trailer hitch security system, comprising a housing assembly. The housing assembly comprises first and second ends and at least first, second, third, and fourth walls. The first and second walls comprise first holes that align. The first holes having first cooperative dimensions and shape to receive a first locking pin therethrough. The first end receives a hitch of a trailer assembly.

A male member protrudes from the second end. The male member has a distal end. The male member further comprises fifth, sixth, seventh, and eighth walls. The fifth and sixth walls comprises second holes that align. The second holes have second cooperative dimensions and shape to receive a second locking pin therethrough. The distal end inserts into a hitch receiver of a vehicle assembly. The present invention further comprises first and second cable assemblies and an electrical system.

The electrical system has first means to emit an audible alarm at a predetermined decibel with audible sirens when sensors are activated. The electrical system has second means to emit a visual alarm with auxiliary lights when the sensors are activated. The second means also may emit a visual alarm with parking lights of a vehicle assembly and/or trailer lights of a trailer assembly when the sensors are activated. The auxiliary lights, parking lights, and trailer lights illuminate visual patterns, flash, and/or cause a strobe effect. The electrical system has additional means to send an electronic signal to a paging system and GPS transceiver when the sensors are activated. The electrical system has additional means to emit a GPS tracking signal with a GPS transceiver for tracking purposes. The electrical system has additional means to send an electrical signal to lock an electronic brake system of the trailer assembly to immobilize the trailer assembly.

The sensors are set with predetermined sensitivity and may become activated if either doors or windows of the vehicle assembly are opened or tampered with, or if a predetermined force is placed upon the trailer assembly. The housing assembly and the male member have a square tubular shape and each define an internal cavity. First and second locks to lock the first and second locking pins.

The electrical system further comprises a vehicle connector outlet, a trailer connector outlet, auxiliary lights, and a CPU. The CPU comprises power in, ground in, left in, right in, parking in, reverse in, electrical brake in, battery backup, the audible sirens, electrical brake out, reverse out, parking out, right out, left out, ground out, power out, the sensors, and a GPS transceiver.

The first cable assembly connects the housing assembly to the trailer assembly, and the second cable assembly connects the housing assembly to the vehicle assembly.

It is therefore one of the main objects of the present invention to provide a removable trailer hitch security system that is effective against tampering.

It is another object of this invention to provide a removable trailer hitch security system that activates if either doors or windows of a vehicle it is mounted onto are opened or tampered with.

It is another object of this invention to provide a removable trailer hitch security system that activates if either vehicle wheels or trailer wheels of a vehicle-trailer it is mounted onto are tampered with.

It is another object of this invention to provide a removable trailer hitch security system that activates if the ignition system of a vehicle it is mounted onto is tampered with.

It is another object of this invention to provide a removable trailer hitch security system that protects boats, snowmobiles, bicycles, etc. mounted onto a vehicle or trailers from being stolen or tampered with.

It is another object of this invention to provide a removable trailer hitch security system that operates with vehicle power or backup battery power.

It is another object of this invention to provide a removable trailer hitch security system that emits an audible alarm when activated.

It is another object of this invention to provide a removable trailer hitch security system that emits a visual alarm with auxiliary lights, parking lights, and/or trailer lights when sensors are activated.

It is another object of this invention to provide a removable trailer hitch security system that sends an electronic signal to a paging system when activated.

It is another object of this invention to provide a removable trailer hitch security system that emits a GPS tracking signal for tracking the vehicle assembly and/or the trailer assembly.

It is another object of this invention to provide a removable trailer hitch security system that locks an electronic brake system of the trailer assembly to immobilize the trailer assembly.

It is another object of this invention to provide a removable trailer hitch security system that is easy to install and remove without tools.

It is another object of this invention to provide a removable trailer hitch security system that may be inserted into any standard hitch receiver, such as utilized by ("GM"), ("FORD"), ("CHRYSLER"), ("TOYOTA"), and other vehicles having a typical hitch receiver.

It is another object of this invention to provide a removable trailer hitch security system that may be mounted solely on a vehicle, onto both the vehicle and a trailer, or solely on the trailer.

It is yet another object of this invention to provide such a system that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
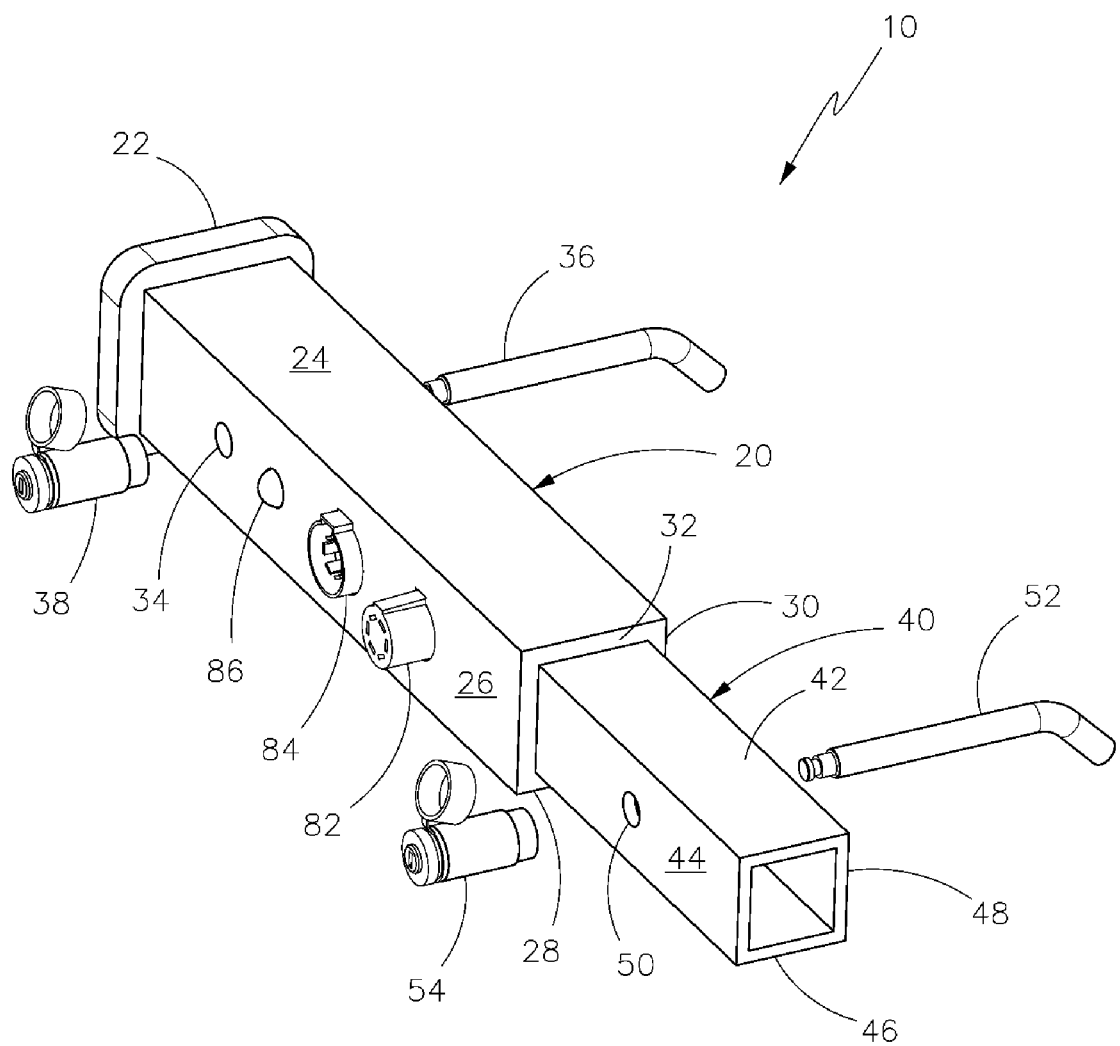
FIG. 1 illustrates a first isometric view of the instant invention.

Referring now to the drawings, the present invention is generally referred to with numeral 10. It can be observed that it basically includes housing assembly 20, male member 40, electrical system 80, vehicle cable assembly 140, and trailer cable assembly 150.

Figure 2:
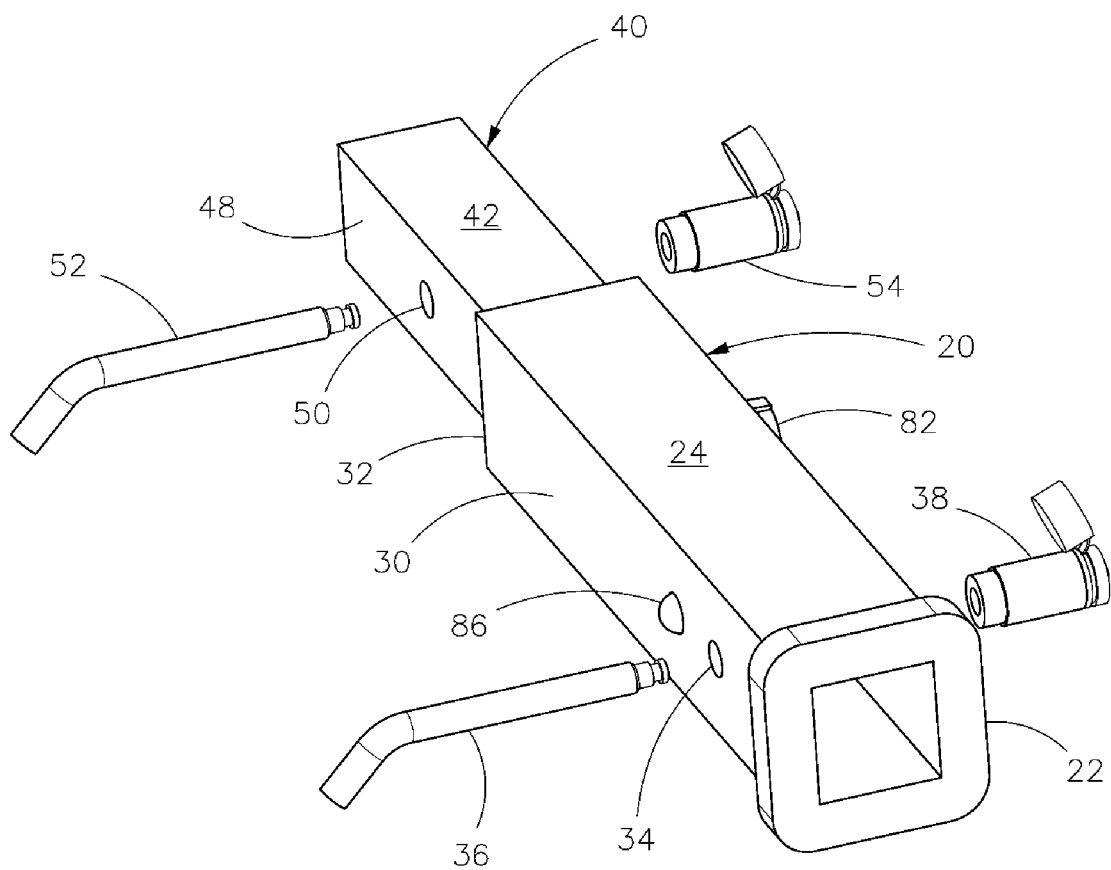
FIG. 2 illustrates a second isometric view of the instant invention.

As seen in FIGS. 1 and 2, housing assembly 20 has a square tubular shape, defining an internal cavity in the preferred embodiment. Housing assembly 20 comprises end 22, top wall 24, lateral wall 26, bottom wall 28, lateral wall 30, and end 32. Holes 34 are aligned on lateral walls 26 and 30. Holes 34 have cooperative dimensions and shape to receive locking pin 36 therethrough, when housing assembly 20 receives hitch 192 of trailer assembly 190, seen in FIG. 3. Lock 38 locks locking pin 36 in place.

Male member 40 protrudes from end 32. Male member 40 also has a square tubular shape and defines an internal cavity that is aligned with the internal cavity of housing assembly 20 in the preferred embodiment. Male member 40 comprises top wall 42, lateral wall 44, bottom wall 46, and lateral wall 48. Holes 50 are aligned on lateral walls 44 and 48. Holes 50 have cooperative dimensions and shape to receive locking pin 52 therethrough when hitch receiver 174, seen in FIG. 3, receives male member 40. Lock 54 locks locking pin 52.

Figure 3:
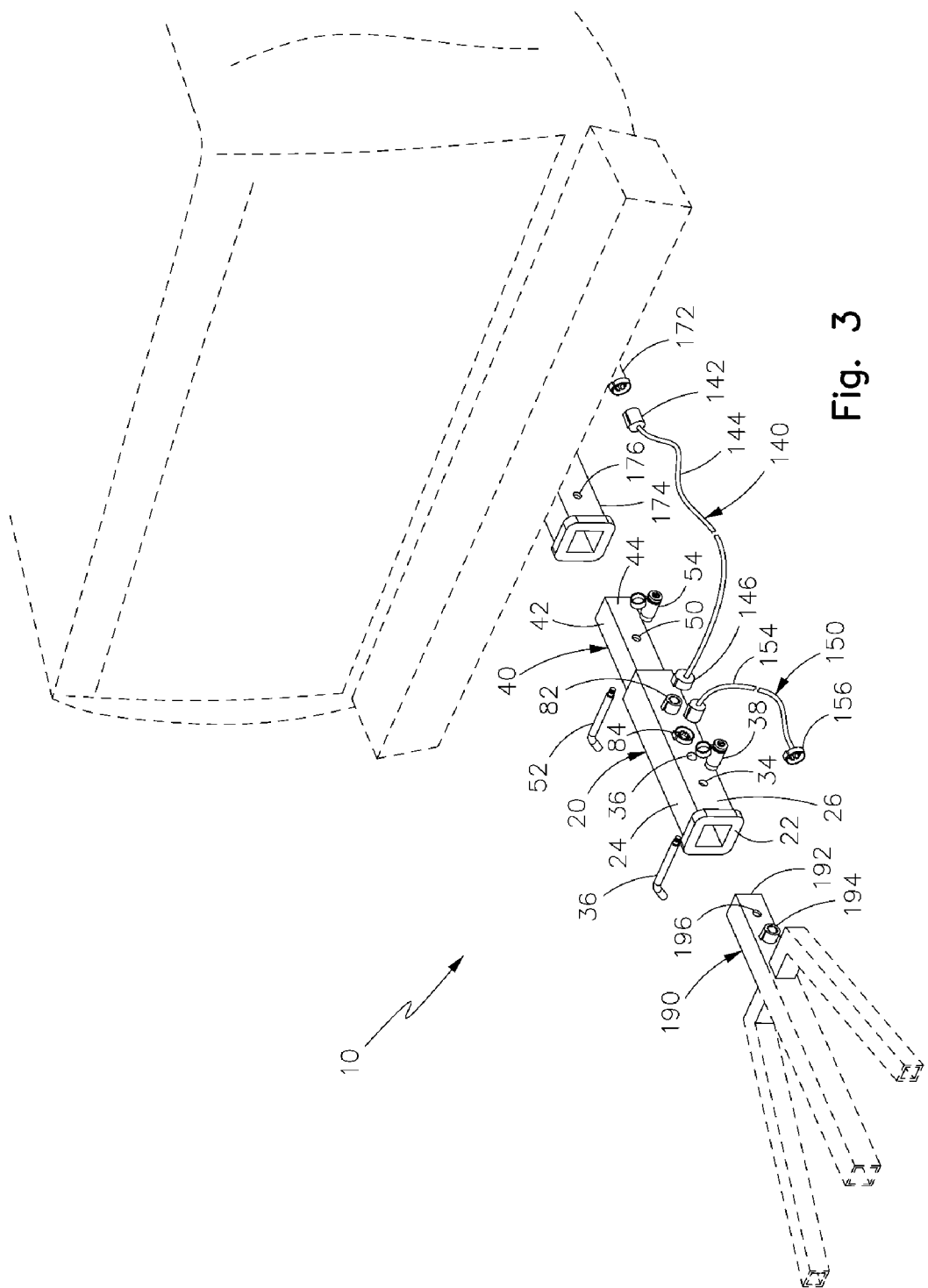
FIG. 3 illustrates a third isometric view of the instant invention in position to be mounted onto both a vehicle and trailer.

As seen in FIG. 3, present invention 10 is in position to be installed onto vehicle assembly 170 and trailer assembly 190, whereby male member 40 is inserted into hitch receiver 174 and is secured with locking pin 52 through hole 176 and lock 54, and housing assembly 20 receives hitch 192 and is secured with locking pin 36 through hole 196 and lock 38.

Vehicle cable assembly 140 comprises plug 142, cable 144, and plug 146. Trailer cable assembly 150 comprises plug 152, cable 154, and plug 156. Vehicle assembly 170 has outlet 172 and hitch receiver 174. Male member 40 has cooperative dimensions and shape to insert within hitch receiver 174. Plug 142 connects to outlet 172, and plug 146 connects to vehicle connector outlet 82. Trailer assembly 190 has hitch 192 and electrical inlet 194. End 22 has cooperative dimensions and shape to mount onto hitch 192. Plug 152 connects to trailer connector outlet 84, and plug 156 connects to electrical inlet 194.

Figure 4:
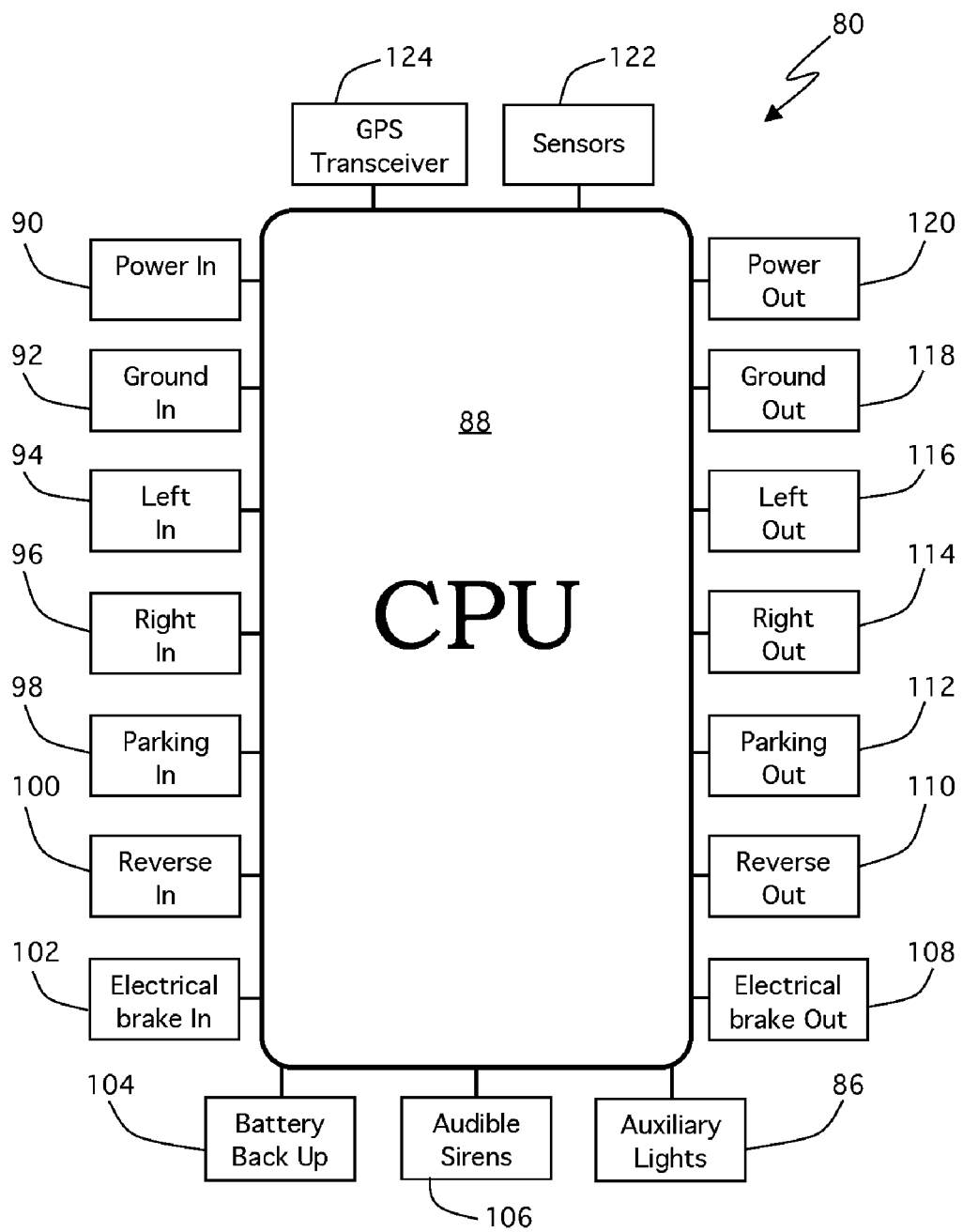
FIG. 4 is an electrical schematic of an electrical assembly of the instant invention.

As best seen in FIG. 4, electrical system 80 comprises vehicle connector outlet 82, trailer connector outlet 84, auxiliary lights 86, and CPU 88. CPU 88 comprises power in 90, ground in 92, left in 94, right in 96, parking in 98, reverse in 100, electrical brake in 102, battery backup 104, audible sirens 106, electrical brake out 108, reverse out 110, parking out 112, right out 114, left out 116, ground out 118, power out 120, sensors 122, and GPS transceiver 124. CPU 88 is housed within housing assembly 20 and male member 40. It is noted that, when instant invention 10 is mounted to a vehicle assembly 170, or vehicle assembly 170 and trailer assembly 190, there is no access to CPU 88.

Instant invention 10 comprises typical electrical circuitry that is not illustrated for simplification purposes. But instant invention 10 comprises all necessary electrical circuitry required to have means to perform the following. Instant invention 10 emits an audible alarm at a predetermined decibel with audible sirens 106 when sensors 122 are activated. Instant invention 10 also emits a visual alarm with auxiliary lights 86 when sensors 122 are activated. Auxiliary lights 86 may illuminate visual patterns, flash, and/or cause a strobe effect. Although not illustrated, instant invention 10 may also emit a visual alarm with parking lights of a vehicle assembly 170 and/or trailer lights of a trailer assembly 190 when the sensors 122 are activated. Instant invention 10 also sends an electronic signal to a paging system with GPS transceiver 124 when sensors 122 are activated. Instant invention 10 emits a GPS tracking signal with GPS transceiver 124 when sensors 122 are activated. Furthermore, instant invention 10 has additional means to send an electrical signal to lock an electronic brake system of trailer assembly 190 to immobilize trailer assembly 190.

Sensors 122 are set with predetermined sensitivity and may become activated if either doors or windows of the vehicle having vehicle assembly 170 are opened or tampered with. Sensors 122 are also set with predetermined sensitivity be become activated if the vehicle of the trailer having trailer assembly 190 is tampered with. Tampering includes, but is not limited to placing a force thereon such as lifting, pushing, or touching. Sensors 122 are also set with predetermined sensitivity be become activated if the vehicle, having vehicle assembly 170, ignition is forced without a matching key.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A removable trailer hitch security system, comprising:
    A) a housing assembly comprising first and second ends and at least first, second, third, and fourth walls, said first and second walls comprise first holes that align, said first holes having first cooperative dimensions and shape to receive a first locking pin therethrough, said first end receives a hitch of a trailer assembly;
    B) a male member that protrudes from said second end, said male member has a distal end, said male member further comprises fifth, sixth, seventh, and eighth walls, said fifth and sixth walls comprising second holes that align, said second holes having second cooperative dimensions and shape to receive a second locking pin therethrough, said distal end inserts into a hitch receiver of a vehicle assembly;
    C) first and second cable assemblies connected to said housing assembly; and
    D) an electrical system connected to the first and second cable assemblies and having first means to emit an audible alarm at a predetermined decibel with audible sirens when sensors are activated.

2. The removable trailer hitch security system set forth in claim 1, further characterized in that said electrical system has second means to emit a visual alarm with auxiliary lights, parking lights, and/or trailer lights when said sensors are said activated.

3. The removable trailer hitch security system set forth in claim 2, further characterized in that said auxiliary lights, parking lights, and/or trailer lights illuminate visual patterns, flash, and/or cause a strobe effect.

4. The removable trailer hitch security system set forth in claim 1, further characterized in that said electrical system has second means to send an electronic signal to a paging system with GPS transceiver when said sensors are said activated.

5. The removable trailer hitch security system set forth in claim 1, further characterized in that said electrical system has second means to emits a GPS tracking signal with a GPS transceiver.

6. The removable trailer hitch security system set forth in claim 1, further characterized in that said electrical system has second means to send an electrical signal to lock an electronic brake system of said trailer assembly to immobilize said trailer assembly.

7. The removable trailer hitch security system set forth in claim 1, further characterized in that said sensors are set with predetermined sensitivity and may become said activated if either doors or windows of said vehicle assembly are opened or tampered with.

8. The removable trailer hitch security system set forth in claim 2, further characterized in that said sensors are set with predetermined sensitivity and may become said activated if either doors or windows of said vehicle assembly are opened or tampered with.

9. The removable trailer hitch security system set forth in claim 4, further characterized in that said sensors are set with predetermined sensitivity and may become said activated if either doors or windows of said vehicle assembly are opened or tampered with.

10. The removable trailer hitch security system set forth in claim 5, further characterized in that said sensors are set with predetermined sensitivity and may become said activated if either doors or windows of said vehicle assembly are opened or tampered with.

11. The removable trailer hitch security system set forth in claim 6, further characterized in that said sensors are set with predetermined sensitivity and may become said activated if either doors or windows of said vehicle assembly are opened or tampered with.

12. The removable trailer hitch security system set forth in claim 1, further characterized in that said sensors are set with predetermined sensitivity and may become said activated if a predetermined force is placed upon said trailer assembly.

13. The removable trailer hitch security system set forth in claim 2, further characterized in that said sensors are set with predetermined sensitivity and may become said activated if a predetermined force is placed upon said trailer assembly.

14. The removable trailer hitch security system set forth in claim 4, further characterized in that said sensors are set with predetermined sensitivity and may become said activated if a predetermined force is placed upon said trailer assembly.

15. The removable trailer hitch security system set forth in claim 5, further characterized in that said sensors are set with predetermined sensitivity and may become said activated if a predetermined force is placed upon said trailer assembly.

16. The removable trailer hitch security system set forth in claim 6, further characterized in that said sensors are set with predetermined sensitivity and may become said activated if a predetermined force is placed upon said trailer assembly.

17. The removable trailer hitch security system set forth in claim 1, further comprising first and second locks to lock said first and second locking pins.

18. The removable trailer hitch security system set forth in claim 1, further characterized in that said electrical system comprises a vehicle connector outlet, a trailer connector outlet, auxiliary lights, parking lights, and/or trailer lights, and a CPU.

19. The removable trailer hitch security system set forth in claim 18, further characterized in that said CPU comprises power in, ground in, left in, right in, parking in, reverse in, electrical brake in, battery backup, said audible sirens, electrical brake out, reverse out, parking out, right out, left out, ground out, power out, said sensors, and a GPS transceiver.

20. The removable trailer hitch security system set forth in claim 1, further characterized in that said first cable assembly connects said housing assembly to said trailer assembly, and said second cable assembly connects said housing assembly to said vehicle assembly.

* * * * *